United States Patent [19]

Conner

[11] Patent Number: 5,597,193
[45] Date of Patent: Jan. 28, 1997

[54] INTERLOCKING PANEL TRUCK BED LINERS

[76] Inventor: Robert H. Conner, 5806 Raymond Rd., Apt. 2B, Madison, Wis. 53711

[21] Appl. No.: 251,343

[22] Filed: May 31, 1994

[51] Int. Cl.$^6$ .................................................. B62D 33/02
[52] U.S. Cl. ........................ 296/37.6; 296/39.2; 224/404; 410/112; 410/140
[58] Field of Search ........................ 296/37.6, 39.1, 296/39.2, 97.23; 105/423; 224/42.42, 403, 404, 539; 410/101, 106, 109, 112, 113, 114, 129, 140, 141; 414/529

[56] References Cited

U.S. PATENT DOCUMENTS

| | | | |
|---|---|---|---|
| 2,733,671 | 2/1956 | Sheesley et al. | 410/114 |
| 4,917,429 | 4/1990 | Giger | 296/37.6 |
| 5,167,433 | 12/1992 | Ryan | 296/39.1 X |
| 5,205,602 | 4/1993 | Hoare et al. | 296/39.1 |
| 5,240,301 | 8/1993 | Arnold | 296/39.2 |
| 5,378,094 | 1/1995 | Martin et al. | 410/112 |

FOREIGN PATENT DOCUMENTS

| | | | |
|---|---|---|---|
| 2062499 | 1/1993 | Canada | 296/39.2 |
| 90/15754 | 12/1990 | WIPO | 414/529 |

*Primary Examiner*—Andrew C. Pike

[57] ABSTRACT

An interlocking panel truck bed liner comprises a horizontal grid base formed in a solid planar rectangular configuration. The base has an upper surface and a lower surface. The lower surface includes coupling devices to permit affixation to the floor of a truck bed. The upper surface has a plurality of perpendicularly intersecting, rectangular-shaped horizontal grooves. Four vertical sidewall liners are each formed in a solid planar rectangular configuration with a front surface and a rear surface. The rear surface of each sidewall liner includes coupling devices to permit vertical affixation to the sidewalls and tailgate of a truck. The front surface of each sidewall liner includes vertical grooves positioned in alignment with the grooves in the grid base. A plurality of interlocking panels are each formed in a planar rectangular configuration. Each panel has two identical surfaces. The panels are positioned vertically in an operative orientation and include a plurality of coupling devices. The panels are adapted to couple to each other in parallel and perpendicular orientations. The panels are positioned within the grooves of the sidewall liners and grid base in an operative orientation.

2 Claims, 4 Drawing Sheets

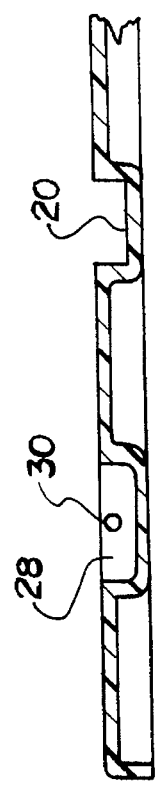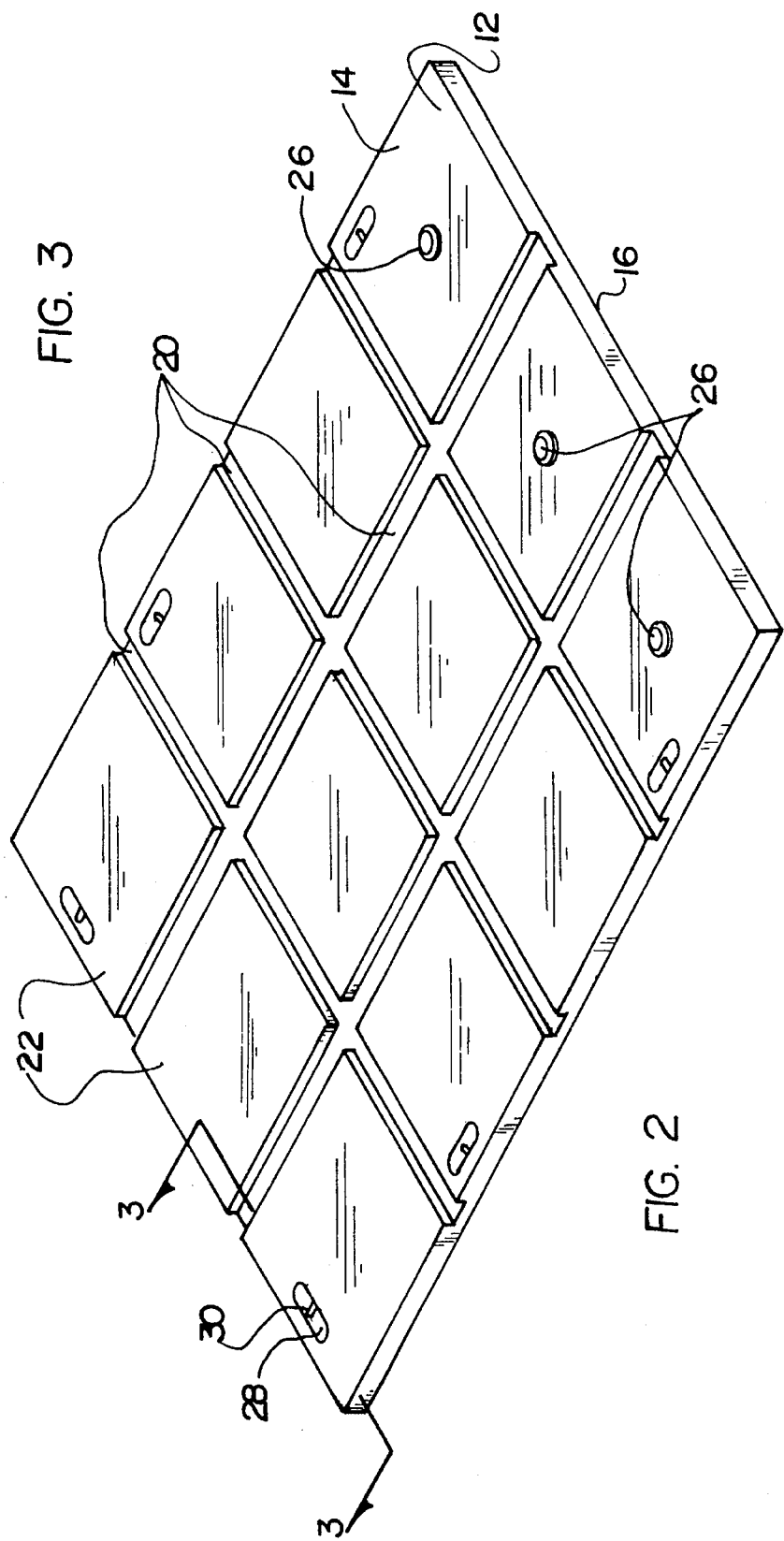

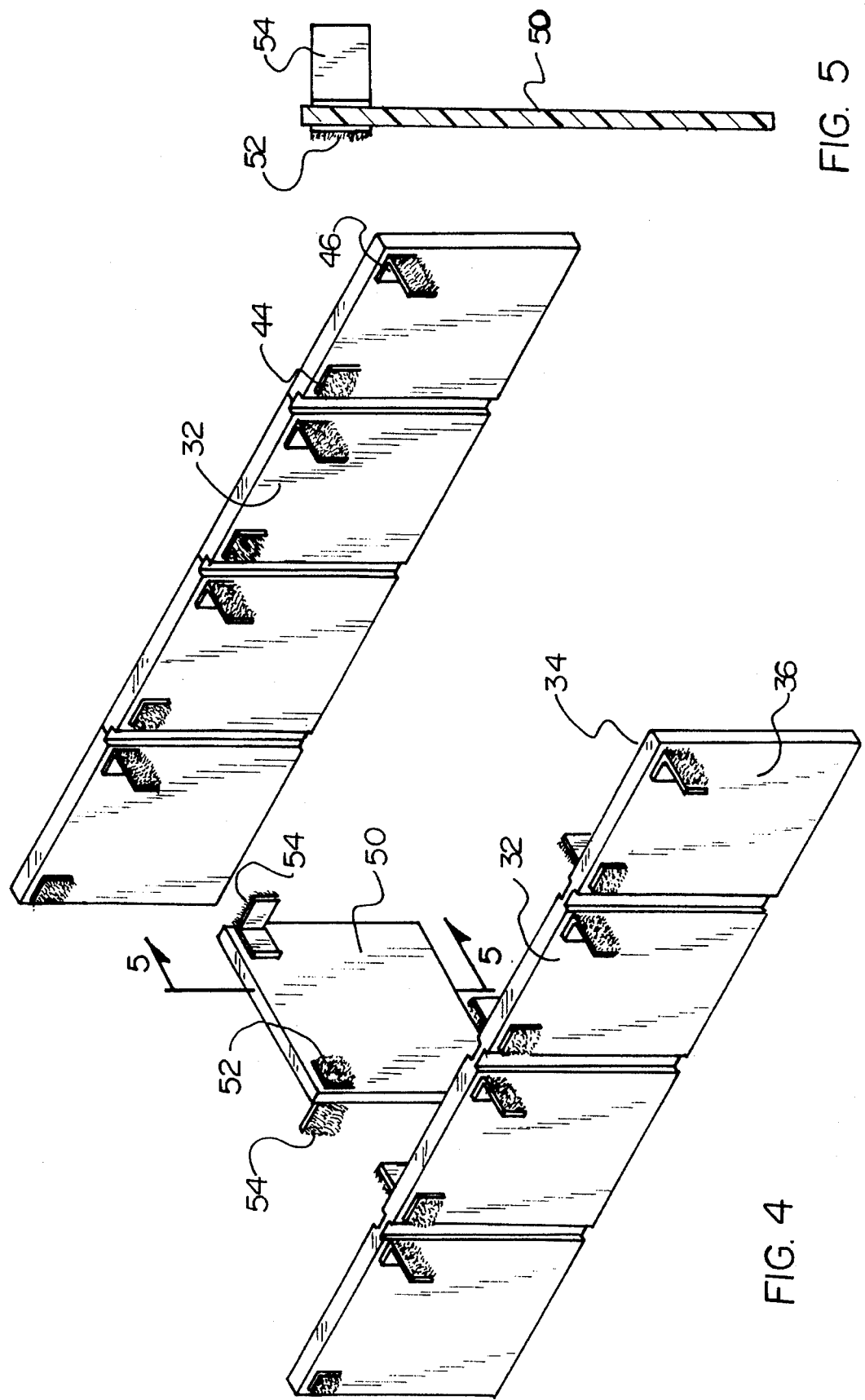

INTERLOCKING PANEL TRUCK BED LINERS

BACKGROUND OF THE INVENTION

1. Field of the Invention

The present invention relates to interlocking panel truck bed liners and more particularly pertains to arranging the interlocking panels in a variety of configurations to protect truck bed surfaces and items contained thereupon.

2. Description of the Prior Art

The use of liners for truck beds is known in the prior art. More specifically, liners for truck beds heretofore devised and utilized for the purpose of protecting the surfaces of truck beds and their contents are known to consist basically of familiar, expected, and obvious structural configurations, notwithstanding the myriad of designs encompassed by the crowded prior art which has been developed for the fulfillment of countless objectives and requirements.

By way of example, the prior art discloses in Davis U.S. Pat. No. 4,890,874 a liner for a pickup truck bed.

Patti U.S. Pat. No. 4,986,590 discloses a truck bed liner.

Falzone U.S. Pat. No. 4,997,227 discloses a truck liner.

Abstetar U.S. Pat. No. 4,944,612 discloses a truck bed liner.

Richardson Lastly, U.S. Pat. No. Des. 252,677 discloses a truck bed liner.

In this respect, the interlocking panel truck bed liners according to the present invention substantially depart from the conventional concepts and designs of the prior art, and in doing so provide an apparatus primarily developed for the purpose of arranging the interlocking panels in a variety of configurations to protect truck bed surfaces and items contained thereupon.

SUMMARY OF THE INVENTION

The present invention provides an improved interlocking panel truck bed liners. As such, the general purpose of the present invention, which will be described subsequently in greater detail, is to provide a new and improved interlocking panel truck bed liners and method.

To attain this, the present invention essentially comprises a new and improved interlocking panel truck bed liner comprising a horizontal grid base fabricated of plastic and formed in a generally solid planar rectangular configuration with parallel long side edges defining its length and parallel short side edges defining its width. The base has an upper surface and a lower surface with a small thickness therebetween. The lower surface of the base includes pile type fasteners to permit affixation to the floor of a truck bed which includes pile type fasteners affixed thereto. The upper surface has a plurality of perpendicularly intersecting, long rectangular-shaped horizontal grooves arranged in a grid configuration. The area between the grooves defines the boundaries of a plurality of generally rectangular-shaped floor segments. The floor segments adjacent to the tailgate of the truck include centrally located circular depressions, each having a rotatable roller ball positioned therein. A portion of the surface of the balls is positioned above the plane of the floor segment. The balls have a soft outer surface and are adapted to aid a user in placing items in the bed of the truck by sliding them over the roller balls. The upper surface of several of the floor segments include generally oval-shaped notches with centrally located rods positioned therein. The rods are adapted to permit the attachment of ropes and other coupling devices for the purpose of securing items positioned upon the base.

Four vertical sidewall liners are comprised of plastic and formed in a generally solid planar rectangular configuration. Parallel long side edges define its length and parallel short side edges define its width. The liners have a front surface and a rear surface with a small thickness therebetween. The rear surface includes pile type fasteners positioned vertically in the operative orientation. The rear surface is affixed to the sidewalls and tailgate of a truck bed which includes pile type fasteners affixed thereto. The front surface of the liners include grooves positioned vertically in the operative orientation. The grooves are positioned in alignment with the grooves in the grid base. The area between the grooves in the liner defines the boundaries of a plurality of generally rectangular shaped sidewall segments. The liners have an upper region and a lower region when positioned in the operative orientation. Each liner includes two pile type fasteners affixed near the upper corners of each segment. One of the fasteners is formed in a flat generally planar rectangular configuration. The other fastener is formed as a flexible, generally planar rectangular member shaped in an L-shaped configuration. One portion of the L-shaped member is affixed to the sidewall segment, and the other portion of the member is positioned perpendicular to the plane of the segment. The perpendicularly oriented portion has the fastener affixed to its surface.

A plurality of interlocking panels are each comprised of plastic and formed in a generally solid planar rectangular configuration. Parallel long side edges define its length and parallel short side edges define its width. The panels each have two identical surfaces with a small thickness therebetween. The panels measure approximately the same length and width as the floor segments of the grid base and side wall segments of the sidewall liners. The panels are positioned vertically in the operative orientation and include an upper region and a lower region. Each panel includes four pile type fasteners affixed near its upper corners. Two of the fasteners are formed in a flat, generally planar rectangular configuration. The other two fasteners are formed as flexible, generally planar rectangular members shaped in an L-shaped configuration. The two flat fasteners are affixed to opposite upper corners of each surface of each panel. The L-shaped members each have one of their ends affixed to opposite upper corners of each surface of each panel. The other portion of each L-shaped member is positioned perpendicular to the plane of the panel and includes a pile type fastener affixed to its surface. The panels are adapted to securely couple to each other in parallel and perpendicular orientations in order to form a wide variety of configurations. The panels are adapted to be positioned within the grooves of the side wall liners and grid base in the operative orientation.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Still another object of the present invention is to arrange the interlocking panels in a variety of configurations to protect truck bed surfaces and items contained thereupon.

Lastly, it is an object of the present invention to provide new and improved an interlocking panel truck bed liners comprising a horizontal grid base formed in a solid planar rectangular configuration. The base has an upper surface and a lower surface with a small thickness therebetween. The lower surface of the base includes coupling devices to permit affixation to the floor of a truck bed. The upper surface has a plurality of perpendicularly intersecting, rectangular-shaped horizontal grooves. Four vertical sidewall liners are formed in a solid planar rectangular configuration. The liners have a front surface and a rear surface with a small thickness therebetween. The rear surface of the liners include coupling means to permit vertical affixation to the sidewalls and tailgate of a truck bed in the operative orientation. The front surface of the liners include vertical grooves positioned in alignment with the grooves in the grid base. Each liner includes a plurality of coupling devices affixed thereto. A plurality of interlocking panels are each formed in a planar rectangular configuration. Each panel each has two identical surfaces with a small thickness therebetween. The panels are positioned vertically in the operative orientation and include a plurality of coupling devices affixed thereto. The panels are adapted to couple to each other in parallel and perpendicular orientations. The panels are positioned within the grooves of the side wall liners and grid base in the operative orientation.

These together with other objects of the invention, along with the various features of novelty which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a top perspective view of the grid base component of the apparatus.

FIG. 3 is a broken away cross sectional view of the grid base taken along line 3—3 of FIG. 2.

FIG. 4 is a perspective view of the front surfaces of two sidewall liners and one interlocking panel.

FIG. 5 is a cross sectional view of the interlocking panel shown in FIG. 4 taken along line 5—5.

The same reference numerals refer to the same parts through the various Figures.

DESCRIPTION OF THE PREFERRED EMBODIMENT

Figure 1:
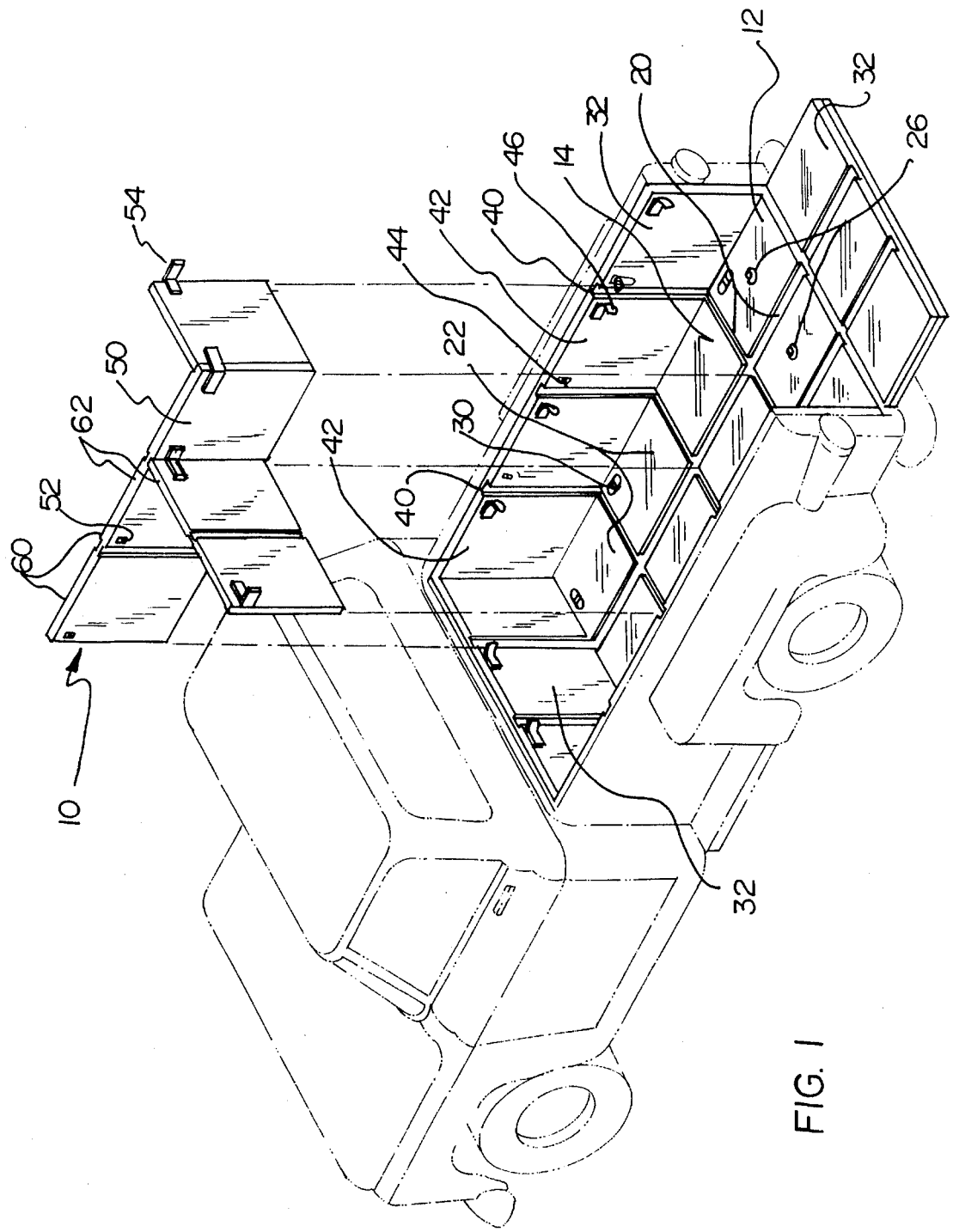
FIG. 1 is a perspective view of the preferred embodiment of the interlocking panel truck bed liners constructed in accordance with the principles of the present invention.
Figure 6:
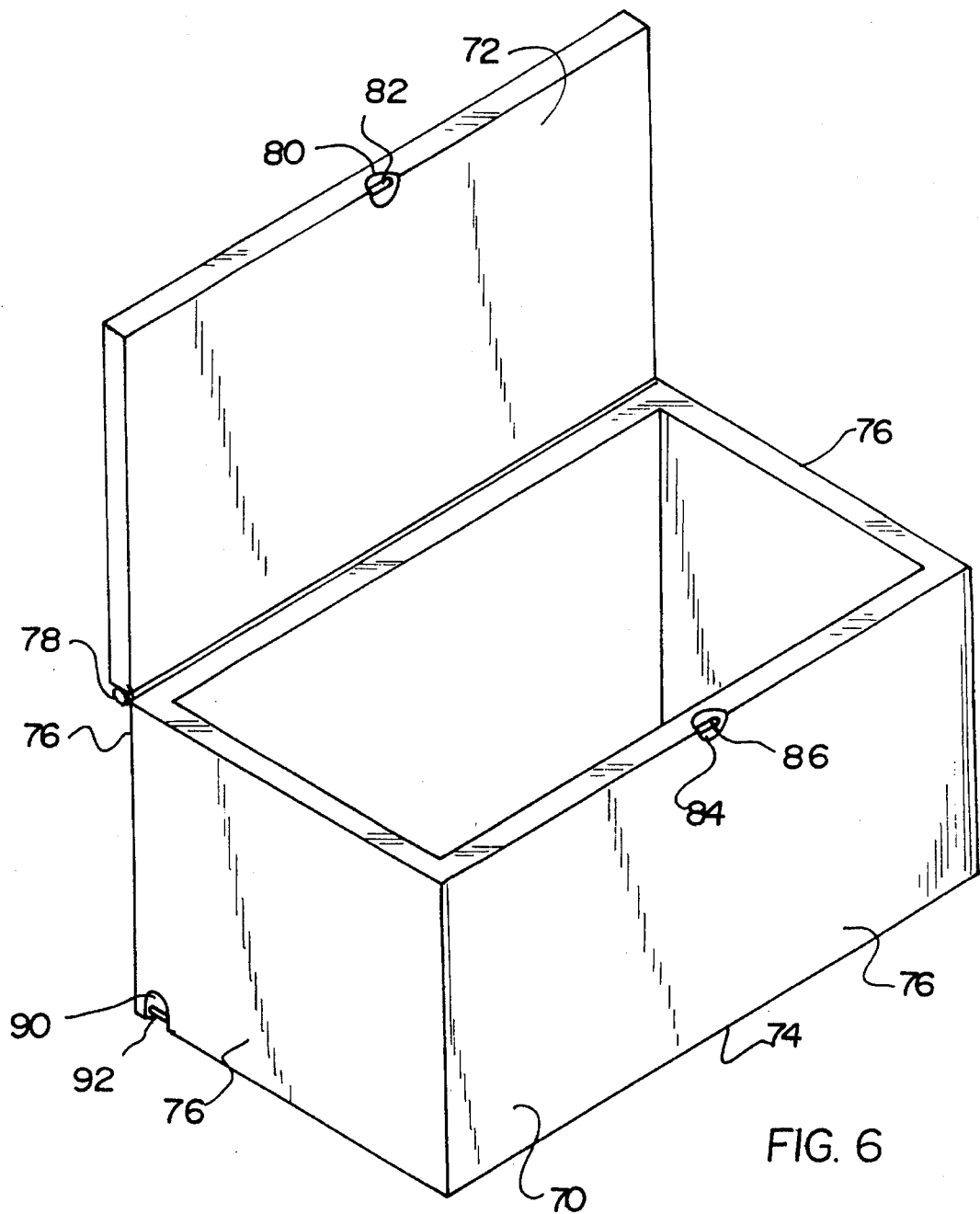
FIG. 6 is a perspective view of a tool box which is adapted to be coupled to the interlocking panel truck bed liner in an alternative embodiment of the apparatus.
Figure 7:
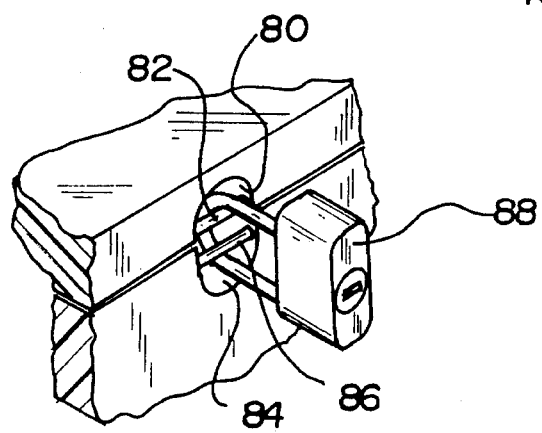
FIG. 7 is a broken away perspective view of the recessed notch and rod of the tool box with a cooperatively coupled padlock.

With reference now to the drawings, and in particular to FIG. 1 thereof, the preferred embodiment of the new and improved interlocking panel truck bed liners embodying the principles and concepts of the present invention and generally designated by the reference numeral 10 will be described.

Specifically, it will be noted in FIGS. 1 through 7, that there is provided a new and improved interlocking panel truck bed liner. The interlocking panel truck bed liner 10, in its broadest context, comprises a grid base 12, four sidewall liners 32, and a plurality of interlocking panels 50.

More specifically, the horizontal grid base 12 is fabricated of plastic and formed in a generally solid planar rectangular configuration with parallel long side edges defining its length and parallel short side edges defining its width. The base 12 has an upper surface 14 and a lower surface 16 with a small thickness therebetween. The lower surface 16 of the base includes pile type fasteners to permit affixation to the floor of a truck bed which includes pile type fasteners affixed thereto. The grid base is positioned in the truck with the short side edges positioned adjacent to the cab and tailgate of the truck, respectively. The upper surface 14 has a plurality of perpendicularly intersecting, long rectangular shaped horizontal grooves 20 arranged in a grid configuration. Note FIGS. 1 and 2.

The area between the grooves defines the boundaries of a plurality of generally rectangular shaped floor segments 22. The floor segments 22 adjacent to the tailgate of the truck include centrally located circular depressions, each having a rotatable roller ball 26 positioned therein. Each circular depression has a perimeter with a ring positioned around it to secure the balls within the depressions. The rings allow rotation of the balls within the depressions. A portion of a surface of each ball is positioned through a ring and above a plane of the floor segment. The roller balls aid a user in placing items in the bed of the truck by sliding the items over the portion of the roller balls extending through the rings. In the preferred embodiment each roller ball has an elastomeric coating around its outer surface. Each segment is comprised of flexible materials to provide a soft surface for items positioned upon them. Note FIGS. 1 and 3.

The upper surface of several of the floor segments include generally oval shaped notches 28 with centrally located rods 30 positioned therein. The rods 30 are adapted to permit the attachment of ropes and other coupling devices for the purpose of securing items positioned upon the base 12. Note FIG. 3 in particular.

The second component of the apparatus is four vertical sidewall liners 32 which are comprised of plastic and formed in a generally solid planar rectangular configuration. Parallel long side edges define its length and parallel short side edges define its width. The liners 32 have a front surface 34 and a rear surface 36 with a small thickness therebetween. The rear surface is affixed in a vertical orientation to the sidewalls and tailgate of a truck bed which includes pile type fasteners affixed thereto. An analogous pile type fastener can be easily affixed to the inner surface of the truck sidewall. The front surface 34 of the liners include grooves 40 positioned vertically in the operative orientation. The grooves 40 are positioned in alignment with the grooves 20 in the grid base. The grooves form right angles to each other in the operative orientation. Note FIG. 1.

The area between the grooves in the sidewall liner defines the boundaries of a plurality of generally rectangular shaped sidewall segments 42. Each sidewall segment is comprised of flexible materials to provide a soft surface for items positioned against them. The liners 32 have an upper region and a lower region when positioned in the operative orientation. Each liner 32 includes two pile type fasteners 44, 46 affixed near the upper corners of each segment 42. One of the fasteners 44 is formed in a flat generally planar rectangular configuration. The other fastener 46 is formed as a flexible, generally planar rectangular member shaped in an L-shaped configuration. One portion of the L-shaped member is affixed to the sidewall segment 42, and the other portion of the member is positioned perpendicular to the plane of the segment 42. The perpendicularly oriented portion has the fastener affixed to its surface. The flexibility of the L-shaped fasteners permit them to be bent at a variety of angles to permit coupling with other components of the apparatus. Note FIGS. 1 and 4.

The third component of the apparatus is a plurality of interlocking panels 50 which are each comprised of plastic and formed in a generally solid planar rectangular configuration. Parallel long side edges define its length and parallel short side edges define its width. The panels 50 each have two identical surfaces with a small thickness therebetween. The panels 50 measure approximately the same length and width as the floor segments 22 of the grid base 12 and side wall segments 42 of the sidewall liners 32. The panels 50 are positioned vertically in the operative orientation and include an upper region and a lower region. The panels are comprised of flexible materials to protect the contents of items contained therein. Note FIGS. 1 and 4.

Each panel includes four pile type fasteners 52, 54 affixed near its upper corners. Two of the fasteners 52 are formed in a flat, generally planar rectangular configuration. The other two fasteners 54 are formed as flexible, generally planar rectangular members shaped in an L-shaped configuration. The two flat fasteners 52 are affixed to opposite upper corners of each surface of each panel 50. The L-shaped fasteners 54 each have one of their ends affixed to opposite upper corners of each surface of each panel 50. The other portion of each L-shaped member is positioned perpendicular to the plane of the panel and includes a pile type fastener affixed to its surface. The panels 50 are adapted to securely couple to each other in parallel 60 and perpendicular 62 orientations in order to form a wide variety of configurations. The panels 50 are adapted to be positioned within the grooves 40 of the side wall liners and grooves 20 of the grid base in the operative orientation. The flexible pile type fasteners can be manipulated so that the interlocking panels couple with each other to form a wide variety of configurations. If transporting a small item, a small tight box may be configured. If transporting a large or tall item, a large box may be configured. Note FIGS. 1 and 4.

In an alternative embodiment of the apparatus, a tool box 70 is formed as a generally rectangular shaped hollow box which is adapted to be coupled on top of the grid base 12. The box has a lid 72, a floor 74, and four vertical sidewalls 76. The lid 72 is formed as a hinged 78 cover. The front portion of the lid 72 is located opposite from the hinge 78 and includes a centrally located recessed notch 80 with a rod 82 extending therethrough. The uppermost extent of the front sidewall includes a centrally located recessed notch 84 with a rod 86 extending therethrough. The notches 80, 84 are in alignment when the lid 72 is positioned in the closed orientation. The box may be utilized to store tools, supplies, or other items. Note FIG. 6.

A padlock 88 is adapted to cooperatively couple through the rods 82, 86 when locking of the tool box 70 is desired. Note FIG. 7. The lowermost extent of two sidewalls also includes recessed notches 90 with rods 92 extending therethrough to permit coupling to the notches 28 and rods 30 in the grid base 12. Note FIG. 7.

The interlocking panel truck bed liner provides truck owners with a bed liner in a grid configuration. The unique element about this product is that the interlocking panels are configured to accommodate objects of various sizes. The size specific configurations secure and protect materials being transported.

For example, to illustrate its adaptability, a caterer might be carrying a tray of food which might require a smaller space than a set of tools. In this case the panels could be adjusted to keep the items carried from sliding, thereby preventing damage as well as the dangerous consequences of items falling off the truck.

The interlocking panel truck bed liner has a molded plastic construction, with roller balls extending from some of its floor segments. The rollers make it easy to slide items on and off the grid base. The panels themselves are secured with pile type fasteners. Each panel has two different size fasteners to provide flexibility to the system. The sidewall panels are affixed to the sidewalls of the truck and extend the full length of the vehicle's bed. Utilizing the different configurations, the user can quickly and easily build a structure that is suitable for carrying a wide variety of materials.

Present systems are of the do-it-yourself variety and provide no benefit to building professionals or catering contractors who need the flexibility which this system can provide.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly, and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described.

What is claimed as being new and desired to be protected by Letters Patent of the United States is as follows:

1. An interlocking panel truck bed liner comprising, in combination:

a horizontal grid base, the base being comprised of plastic and formed in a generally solid planar rectangular configuration with parallel long side edges defining a length thereof and parallel short side edges defining a width thereof, the base having an upper surface and a lower surface with a small thickness therebetween, the upper surface having a plurality of perpendicularly intersecting, long rectangular-shaped horizontal grooves arranged in a grid configuration, an area between the grooves comprising a plurality of generally rectangular-shaped floor segments, the floor segments adjacent to a tailgate of a truck including centrally located circular depressions each having a rotatable roller ball positioned therein, each circular depression including a perimeter with a ring positioned therearound to secure the balls within the depressions while allowing rotation of the balls therein, a portion of a surface of each ball being positioned through a ring and above a plane of the floor segments, the balls aiding a user in placing items in a bed of the truck by sliding the items over the roller balls, the upper surface of six of the floor segments including generally oval-shaped notches with centrally located rods positioned therein;

four vertical sidewall liners, the liners being formed in a generally solid planar rectangular configuration with parallel long side edges defining a length thereof, with parallel short side edges defining a width thereof, each liner having a front surface and a rear surface with a small thickness therebetween, the rear surface of each liner including pile type fasteners, each liner being positioned vertically in an operative orientation with the rear surface of each liner being affixed to a sidewall and the tailgate of the truck, the front surface of each sidewall liner including grooves positioned vertically in an operative orientation, the grooves of each sidewall liner being positioned in alignment with the grooves in the grid base, an area between the grooves in each sidewall liner comprising a plurality of generally rectangular-shaped sidewall segments, the liners having an upper region with upper corners and a lower region with lower corners when positioned in said operative orientation thereof, each liner including first and second pile type fasteners affixed near the upper corners of each sidewall segment, each first fastener being formed in a flat generally planar rectangular configuration, each second fastener being formed as a flexible generally planar rectangular member shaped in an L-shaped configuration, one portion of the L-shaped member being affixed to one of the sidewall segments and another portion of the L-shaped member being positioned perpendicular to a plane of one of the sidewall segments; and a plurality of interlocking panels, each panel being comprised of plastic and formed in a generally solid planar rectangular configuration with parallel long side edges defining a length thereof and parallel short side edges defining a width thereof, each panel having two identical surfaces with a small thickness therebetween, each panel measuring approximately the same length and width as the floor segments of the grid base and the sidewall segments of the sidewall liners, each panel being positioned vertically in an operative orientation and including an upper region with upper corners and a lower region with lower corners, each panel including first, second, third, and fourth pile type fasteners affixed near the upper corners thereof, said first and second pile type fasteners thereof being formed in a flat generally planar rectangular configuration, said third and fourth pile type fasteners thereof being formed as flexible generally planar rectangular members shaped in an L-shaped configuration, said first and second fasteners thereof being affixed to the upper corners of each surface of each panel, said third and fourth pile type fasteners each having one end affixed to the upper corners of each panel, with another end of each third and fourth pile type fastener being positioned perpendicular to a plane of each interlocking panel, each panel being adapted to securely couple to each other in parallel and perpendicular orientations in order to form different configurations, each panel being adapted to be positioned within the grooves of the sidewall liners and the grid base in the operative orientation.

2. An interlocking panel truck bed liner comprising:

a horizontal grid base formed in a generally solid planar rectangular configuration with parallel long side edges and parallel short side edges, the base having an upper surface and a lower surface with a small thickness therebetween, the upper surface having a plurality of perpendicularly intersecting, generally rectangular-shaped horizontal grooves, the upper surface of the grid base further including a plurality of generally oval-shaped notches with centrally located rods positioned therein;

four vertical sidewall liners each formed in a generally solid planar rectangular configuration with parallel long side edges and parallel short side edges, each liner having a front surface and a rear surface with a small thickness therebetween, each liner being vertically affixed to sidewalls and a tailgate of a truck bed in an operative orientation, the front surface of each sidewall liner including grooves positioned vertically in an operative orientation, the grooves of each sidewall liner being positioned in alignment with the grooves in the grid base, each liner including a plurality of coupling devices affixed thereto;

a plurality of interlocking panels each formed in a generally solid planar rectangular configuration with parallel long side edges and parallel short side edges, the panels each having two identical surfaces with a small thickness therebetween, the panels being positioned vertically in operative orientation, each panel including a plurality of coupling devices affixed thereto, each panel being adapted to securely couple to each other in parallel and perpendicular orientations, with the panels being adapted to be positioned within the grooves of the sidewall liners and the grid base in the operative orientation; and a tool box formed as a generally rectangular-shaped hollow box, the box having a lid, a floor, a front wall, a rear wall, and two vertical sidewalls, the lid being coupled to one of the vertical sidewalls of the box by a hinge, a front portion of the lid located opposite from the hinge including a centrally located recessed notch with a locking rod extending therethrough, an uppermost extent of the front wall including a centrally located recessed notch with a locking rod extending therethrough, the notches of the front wall and lid being in alignment when the lid is positioned in a closed orientation, a padlock being adapted to be coupled around said locking rods when locking of the tool box is desired, a lowermost extent of at least one sidewall including a recessed notch with a rod extending therethrough.

\* \* \* \* \*